(12) United States Patent
Jung

(10) Patent No.: US 7,161,913 B2
(45) Date of Patent: Jan. 9, 2007

(54) PACKET TRANSMISSION METHOD FOR MOBILE INTERNET

(75) Inventor: Tae-Sung Jung, Sangju-shi (KR)

(73) Assignee: Samsung Electronics Co., Ltd. (KR)

( * ) Notice: Subject to any disclaimer, the term of this patent is extended or adjusted under 35 U.S.C. 154(b) by 921 days.

(21) Appl. No.: 09/918,095

(22) Filed: Jul. 30, 2001

(65) Prior Publication Data

US 2002/0015396 A1 Feb. 7, 2002

(30) Foreign Application Priority Data

Aug. 5, 2000 (KR) ............... 2000-45474

(51) Int. Cl.
*H04Q 7/00* (2006.01)
*H04Q 7/20* (2006.01)
*H04L 12/56* (2006.01)

(52) U.S. Cl. ............ 370/331; 370/338; 370/401; 455/432.1; 455/436

(58) Field of Classification Search ........... 370/310, 370/328, 331, 338, 392, 395.31, 401, 276; 455/432.1, 433, 436; 709/218, 221, 238
See application file for complete search history.

(56) References Cited

U.S. PATENT DOCUMENTS

| | | | | |
|---|---|---|---|---|
| 5,325,362 A * | 6/1994 | Aziz | ............ | 370/405 |
| 6,160,804 A * | 12/2000 | Ahmed et al. | ............ | 370/349 |
| 6,466,964 B1 * | 10/2002 | Leung et al. | ............ | 709/202 |
| 6,560,217 B1 * | 5/2003 | Peirce et al. | ............ | 370/351 |
| 6,574,214 B1 * | 6/2003 | Khalil et al. | ............ | 370/349 |
| 6,578,085 B1 * | 6/2003 | Khalil et al. | ............ | 709/241 |
| 6,625,135 B1 * | 9/2003 | Johnson et al. | ............ | 370/332 |
| 6,738,362 B1 * | 5/2004 | Xu et al. | ............ | 370/329 |
| 6,915,325 B1 * | 7/2005 | Lee et al. | ............ | 709/202 |
| 6,925,075 B1 * | 8/2005 | Karagiannis | ............ | 370/338 |
| 2003/0021275 A1 * | 1/2003 | Shabeer | ............ | 370/393 |

OTHER PUBLICATIONS

Montenegro, G., Reverse Tunneling for Mobile IP, Sun Microsystems, Inc. May 1998, Network Working Group, Request for Comments: 2344, pp. 1-19.*
Perkins Charles E., Mobile IP, Sun Microsystems, IEEE Communications Magazine, 0163-6804, May 1997, pp. 84-99.*

* cited by examiner

*Primary Examiner*—Wellington Chin
*Assistant Examiner*—Tri H. Phan
(74) *Attorney, Agent, or Firm*—The Farrell Law Firm

(57) ABSTRACT

A method for transmitting a data packet from a mobile node to a correspondent node through a foreign agent while maintaining security is disclosed. A correspondent node transmits a first data packet for communication with a mobile node to the home agent. Upon receipt of the first data packet from the home agent, the foreign agent transmits the first data packet to the mobile node through a radio channel. The home agent transmits the IP address of the foreign agent to the correspondent node after transmitting the first data packet to the foreign agent. The correspondent node transmits tunneling indication information indicating whether it can decapsulate a data packet encapsulated by the foreign agent to the foreign agent after receiving the IP address of the foreign agent from the home agent. The foreign agent encapsulates subsequent data packets received from the mobile node with a tunneling IP header for reverse tunneling and transmits the encapsulated data packets to the correspondent node, after receiving the tunneling indication information from the correspondent node.

11 Claims, 4 Drawing Sheets

PACKET TRANSMISSION METHOD FOR MOBILE INTERNET

PRIORITY

This application claims priority to an application entitled "Packet Transmission Method for Mobile Internet" filed in the Korean Industrial Property Office on Aug. 5, 2000 and assigned Ser. No. 2000-45474, the contents of which are hereby incorporated by reference.

BACKGROUND OF THE INVENTION

1. Field of the Invention

The present invention relates generally to the mobile Internet, and in particular, to a method for transmitting a data packet using an M-IP (Mobile-Internet Protocol).

2. Description of the Related Art

With a rapid increase in number of Internet users, there is a demand for various radio data services that can support high-speed data transmission (of over 144 Kbps even while the user moves at high speed) and can also support a multimedia service. Aiming to provide a worldwide roaming service, a radio multimedia service and a high-quality voice service, the IMT-2000 (International Mobile Telecommunication-2000) standard proposes a mobile communication technology capable of satisfying the above-stated requirements.

A mobile IP (M-IP) is a protocol, which has been standardized in Mobile IP WG (Working Group) of IETF (Internet Engineering Task Force), and enables a mobile node (MN, or a mobile terminal (MT)) to have a unique IP address to receive a data packet taking the IP address as its destination address (DA) at a given location on the Internet. The mobile IP consists of several network elements such as a home agent (HA), a foreign agent (FA) and a mobile node (MN). The mobile node, which is a mobile computer connected to the foreign agent, communicates with a correspondent node using an IP address assigned thereto. The home agent refers to a host or a router that manages the current location information of the mobile node and encapsulates/decapsulates the data packet. The foreign agent, located in a foreign network which the mobile node exists currently, decapsulates an encapsulated data packet transmitted from the home agent and provides the decapsulated data packet to the mobile node.

FIG. 1 illustrates a method for transmitting a data packet from a correspondent node to a mobile node according to the prior art. Referring to FIG. 1, in a location registration process, a mobile node (MN) 40 recognizes a neighboring foreign agent (FA) 30 through a radio channel and then sends a location registration request to the foreign agent 30. The foreign agent 30 then registers a location of the mobile node 40 in a home agent (HA) 20. The home agent 20 stores an IP address of the foreign agent 30 corresponding to the mobile node 40, to indicate that the mobile node 40 is located in the coverage area of the foreign agent 30.

To transmit a data packet for IP communication to the mobile node 40, a correspondent node (CN or a correspondent station) 10 in a wired network transmits to the home agent 20 a data packet whose destination address (DA) is defined as the address of the mobile node 40. The data packet is transmitted to the home agent 20 according to known IP routing by a default router (not shown) of the correspondent node 10. This is because its destination address is identical to the mobile IP address.

The home agent 20 extracts the destination address, i.e., the mobile IP address of the data packet, and transmits the data packet to the foreign agent 30 corresponding to the mobile node 40 having the extracted mobile IP address. As stated above, the home agent 20 encapsulates the data packet by tunneling and transmits the encapsulated data packet to the foreign agent 30. The foreign agent 30 extracts the data packet by decapsulation and transmits the extracted data packet to the mobile node 40 through the radio channel. Herein, the "tunneling" refers to a security technology for encapsulating an IP data packet with another IP data packet to redirect a datagam directed toward a certain IP address to another IP address.

FIG. 2 illustrates a method for transmitting a data packet from a mobile node to a correspondent node according to the prior art. Referring to FIG. 2, when at least one data packet is received from the correspondent node 10 through the home agent 20, the foreign agent 30 can detect an IP address of the correspondent node 10 from a source address of the received data packet. Thus, the foreign agent 30 can directly transmit the data packet to the correspondent node 10 through IP routing, without passing through the home agent 20.

When a transmission data packet is transmitted to the home agent 20 and a reception data packet is received from the foreign agent 30 as stated above, an incoming routing path of a data packet received at (or input to) the correspondent node 10 may be different from an outgoing routing path of a data packet transmitted from the correspondent node 10. This is because the IP routing transmits the data packet through different nodes at every transmission.

However, in a private network requiring security, a default router of the correspondent node 10 has a security function of comparing a port number of the incoming routing path with a port number of the outgoing routing path, and refuses the received data packet if they are different from each other. In this case, if the transmission data packet from the correspondent node 10 is transmitted to the home agent 20 and the reception data packet is received from the foreign agent 30, the reception data packet may be rejected by the default router of the correspondent node 10. In order to solve this security problem, the foreign agent 30 must transmit the data packet from the mobile node 40 only through the home agent 20.

When the data packet is transmitted through the home agent 20 as stated above, it must pass through a plurality of routing nodes, including the home agent 20, so that there occurs resulting in a time delay and it is not possible to guarantee the security between the home agent 20 and the correspondent node 10.

SUMMARY OF THE INVENTION

It is, therefore, an object of the present invention to provide a method for exchanging data packets between a mobile node having a mobile IP address and a correspondent node in a wired network through forward and reverse tunneling.

It is another object of the present invention to provide a method for transmitting tunneling indication information from the correspondent node to a foreign agent, indicating that a correspondent node can perform a reverse tunneling function.

In accordance with one aspect of the present invention, there is provided a method for transmitting a data packet from a mobile node to a correspondent node through a foreign agent while maintaining security therebetween, in a communication system. The communication system includes the mobile node having a unique mobile IP address, the foreign agent wirelessly connected to the mobile node, the foreign agent having a unique IP address, the home agent capable of performing bi-directional wire communication with the foreign agent, the home agent having mapped information of the mobile IP address of the mobile node and the IP address of the foreign agent, and the correspondent node capable of performing bi-directional wire communication with the home agent. The method comprises transmitting a first data packet for communication with the mobile node from the correspondent node to the home agent; upon receipt of the first data packet from the home agent, transmitting the first data packet from the foreign agent to the mobile node through a radio channel; transmitting the IP address of the foreign agent from the home agent to the correspondent node after transmitting the first data packet to the foreign agent; transmitting tunneling indication information indicating whether the correspondent node can decapsulate a data packet encapsulated by the foreign agent from the correspondent node to the foreign agent after receiving the IP address of the foreign agent from the home agent; and encapsulating in the foreign agent subsequent data packets received from the mobile node with a tunneling IP header for reverse tunneling and transmitting the encapsulated data packets to the correspondent node after receiving the tunneling indication information from the correspondent node.

In accordance with another aspect of the present invention, there is provided a method for exchanging data packets between a mobile node and a foreign agent while maintaining security therebetween, in a communication system. The communication system includes the mobile node having a unique mobile IP address, the foreign agent wirelessly connected to the mobile node, the foreign agent having a unique IP address, the home agent capable of performing bi-directional wire communication with the foreign agent, the home agent having mapped information of the mobile IP address of the mobile node and the IP address of the foreign agent, and the correspondent node capable of performing bi-directional wire communication with the home agent. The method comprises decapsulating in the foreign agent a data packet received from the correspondent node and transmitting the decapsulated data packet to the mobile node when the correspondent node transmits a data packet encapsulated with a tunneling IP header for forward tunneling to the foreign agent using the IP address of the foreign agent; and upon receipt of a packet data for communication with the correspondent node from the mobile node through a radio channel, encapsulating in the foreign agent the received data packet with a tunneling IP header for reverse tunneling, and transmitting the encapsulated data packet to the correspondent node.

In accordance with yet another aspect of the present invention, there is provided a method for transmitting a data packet from a mobile node to a correspondent node through a foreign agent while maintaining security therebetween, in a communication system. The system includes the mobile node having a unique mobile IP address, the foreign agent wirelessly connected to the mobile node, the foreign agent having a unique IP address, the home agent capable of performing bi-directional wire communication with the foreign agent, the home agent having mapped information of the mobile IP address of the mobile node and the IP address of the foreign agent, and the correspondent node capable of performing bi-directional wire communication with the home agent. The method comprises receiving at the foreign agent a data packet for communication with the correspondent node from the mobile node through a radio channel; determining in the foreign agent whether the correspondent node can perform reverse tunneling, by consulting previously stored tunneling indication information; encapsulating the data packet with a tunneling IP header for reverse tunneling and transmitting the encapsulated data packet to the correspondent node if the correspondent node can perform reverse tunneling; and transmitting the data packet to the correspondent node through the home agent if the correspondent node cannot perform reverse tunneling.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
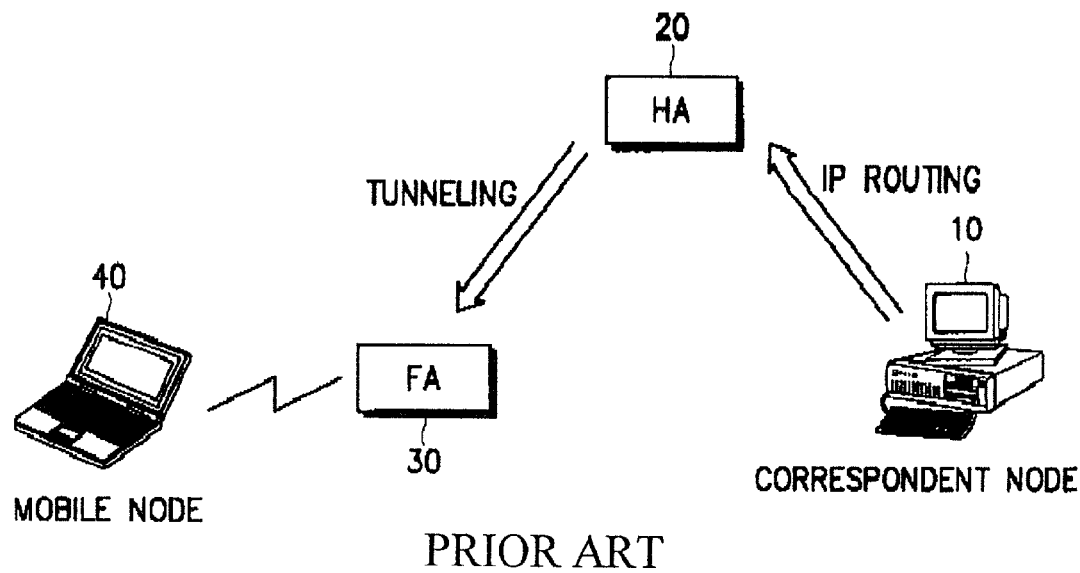
FIG. 1 is a diagram illustrating a method for transmitting a data packet from a correspondent node to a mobile node according to the prior art.
Figure 2:
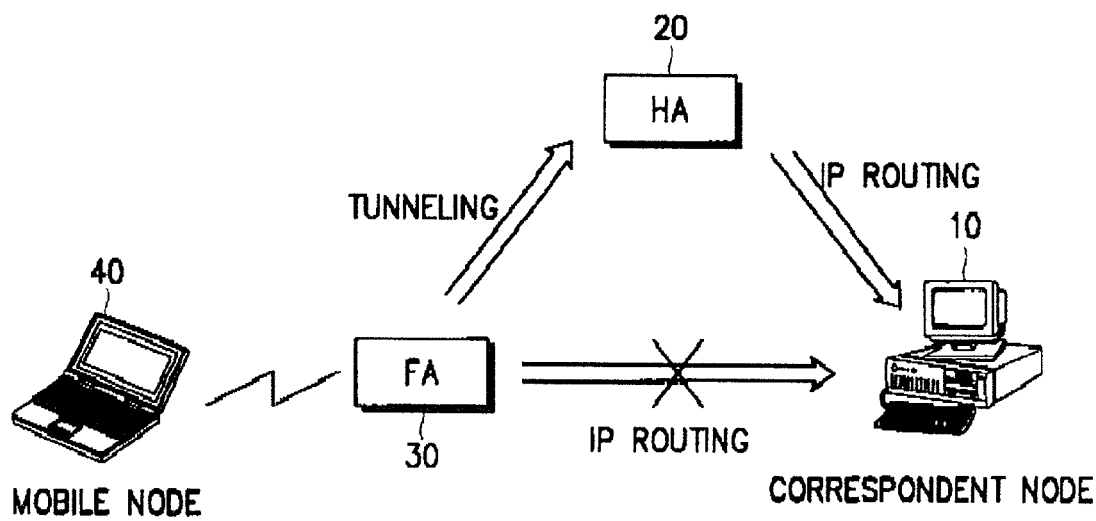
FIG. 2 is a diagram illustrating a method for transmitting a data packet from a mobile node to a correspondent node according to the prior art.
Figure 3:
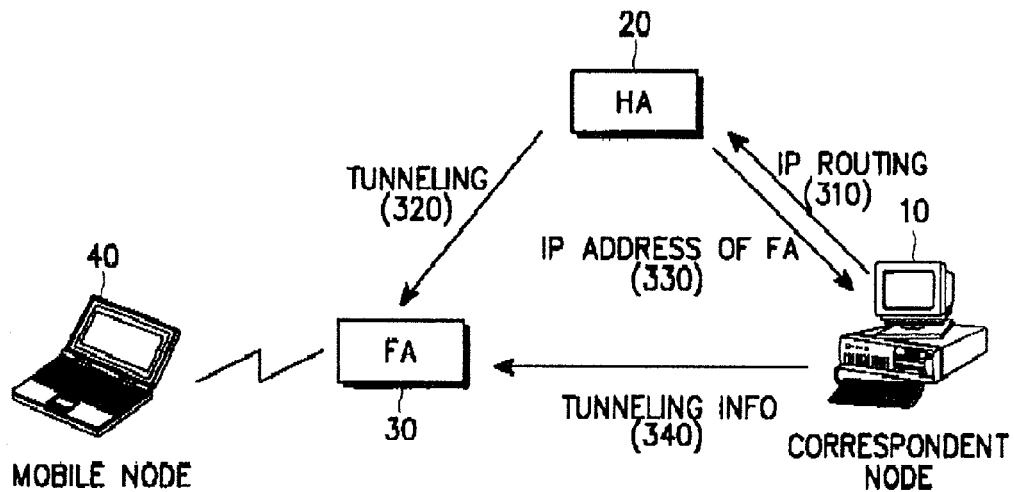
FIG. 3 is a diagram illustrating a method for transmitting a data packet from a correspondent node to a mobile node according to an embodiment of the present invention.
Figure 4:
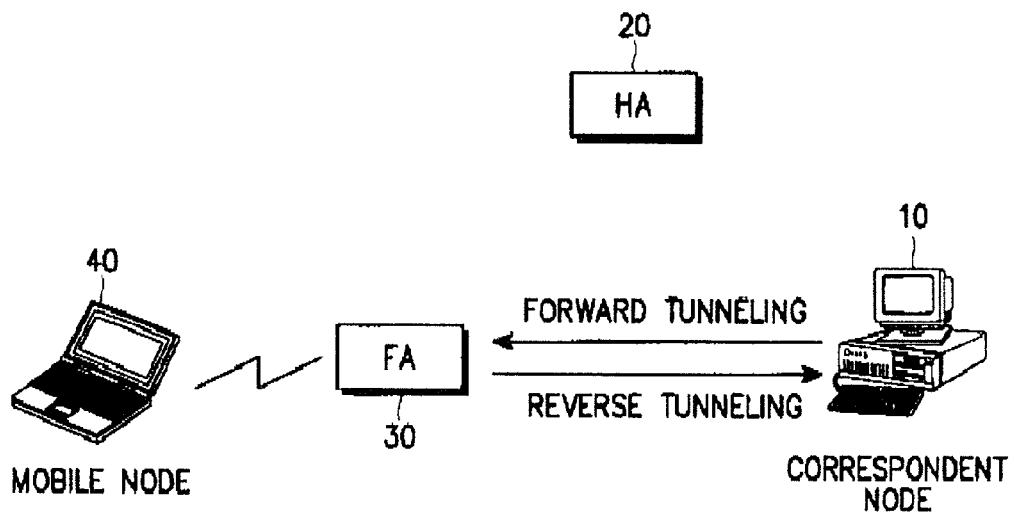
FIG. 4 is a diagram illustrating a method for exchanging data packets between the correspondent node and the mobile node through tunneling according to an embodiment of the present invention.

FIG. 3 illustrates a method for transmitting a first data packet from a correspondent node to a mobile node according to an embodiment of the present invention, and FIG. 4 illustrates a method for exchanging data packets subsequent to the first data packet between the correspondent node and the mobile node. For convenience of explanation, it will be assumed that an IP address of the foreign agent 30 corresponding to the mobile node 40 is previously registered in the home agent 20.

Referring to FIG. 3, to transmit a data packet for IP communication to the mobile node 40, the correspondent node 10 transmits to the home agent 20 a first (or initial) data packet for IP communication with the mobile node 40 (310). A destination address DA of the first data packet is defined as a unique mobile IP address of the mobile node 40, and a source address SA of the first data packet is defined as an IP address of the correspondent node 10.

The correspondent node 10 is a common node in an external network, which intends to communicate with the mobile node 40, and can be a workstation or a personal computer having a fixed IP address, or another mobile node having a mobile IP address. Although the invention will be described with reference to an example where the correspondent node 10 directly controls transmission of the data packet, it will be understood by those skilled in the art that transmission of the data packet can be actually controlled by a default router corrected to the correspondent node 10.

The home agent 20 detects a destination address of the first data packet and transmits the data packet to the foreign agent 30 connected to the mobile node 40 having the corresponding IP address (320), and the foreign agent 30 then transmits the first data packet to the mobile node 40 through a radio channel.

Herein, the home agent 20 transmits the data packet to the foreign agent 30 by tunneling. That is, the home agent 20 adds an additional IP header to the data packet transmitted to the foreign agent 30, and the IP header includes a destination address defined as an IP address of the foreign agent 30 and a source address defined as an IP address of the home agent 20. The data packet encapsulated using the additional IP header is transported to the foreign agent 30 through a security path known as tunneling. Therefore, the additional IP header is called a "tunneling IP header".

The packet data encapsulated with the tunneling IP header can be extracted by only the receiver having a decapsulation function. That is, for tunneling, a transmitter must have a function of encapsulating the tunneling IP header and a receiver must have a function of decapsulating the tunneling IP header. Unlike the general IP routing, the tunneling encapsulates the data packet using the tunneling IP header having IP addresses of an intermediate transmitter and an intermediate receiver, and the final destination is determined at the intermediate receiver by decapsulating the tunneling IP header. Such tunneling guarantees the security between the intermediate transmitter and the intermediate receiver.

Meanwhile, the correspondent node 10 belonging to a private network requiring the security performs encapsulation/decapsulation on the tunneling IP header. In addition, as long as the mobile node 40 does not move to a service area of a foreign agent in another area, the data packet transmitted to the mobile node 40 must be transmitted to the foreign agent 30. In this case, if the correspondent node 10 knows the IP address of the foreign agent 30, it is possible to perform forward tunneling from the correspondent node 10 to the foreign agent 30.

Therefore, the home agent 20 transmits the data packet to the foreign agent 30 (320) and at the same time, transmits the IP address of the foreign agent 30 to the correspondent node 10 (330). As shown in FIG. 4, the correspondent node 10 encapsulates the subsequent data packets to be transmitted to the mobile node 40 with the additional IP header, i.e., the tunneling IP header, whose destination address is defined as the IP address of the foreign agent 30, such that the subsequent data packets are directly transmitted to the foreign agent 30 through the forward tunneling, without passing through the home agent 20. Since the foreign agent 30 fundamentally has the encapsulation and decapsulation functions for tunneling with the home agent 20, it decapsulates the data packets received from the correspondent node 10 without a separate control.

Meanwhile, in order to enable the forward tunneling from the correspondent node 10 to the foreign agent 30 in addition to the security function of the correspondent node 10, reverse tunneling from the foreign agent 30 to the correspondent node 10 must be available. To this end, the foreign agent 30 must previously know whether the correspondent node 10 can perform the reverse tunneling function (i.e., decapsulation function). If the foreign agent 30 cannot determine whether the correspondent node 10 can perform decapsulation, it will always transmit the data packets through the home agent 20.

Therefore, upon receiving the IP address of the foreign agent 30 from the home agent 20 (330), the correspondent node 10 transmits tunneling indication information indicating whether it can perform the tunneling function, to the foreign agent 30 (340). If the foreign agent 30 determines that the correspondent node 10 can perform the reverse tunneling function, based on the tunneling indication, information received from the correspondent node 10, the foreign agent 30 transmits the subsequent data packets to the correspondent node 10 by reverse tunneling (see FIG. 4). If, however, it is determined that the correspondent node 10 cannot perform the reverse tunneling function, the foreign agent 30 transmits the subsequent data packets to the correspondent node 10 through the home agent 20 as in the prior art.

Figure 5:
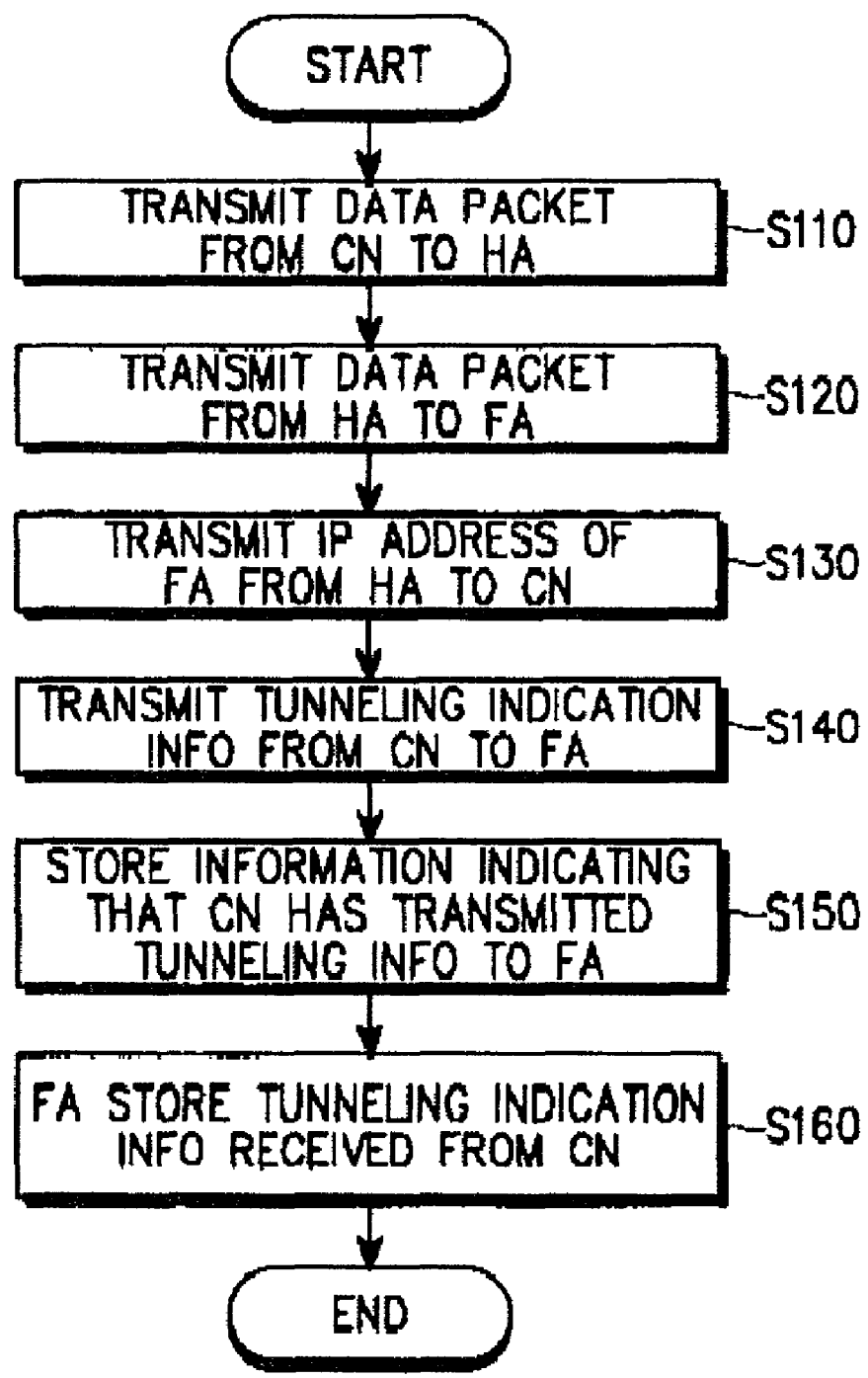
FIG. 5 is a flow chart illustrating a procedure for storing routing information according to an embodiment of the present invention.

FIG. 5 illustrates a procedure for storing tunneling indication information according to an embodiment of the present invention. Referring to FIG. 5, in step S110, the correspondent node 10 transmits a first data packet to be transmitted to the mobile node 40 to the home agent 20 through IP routing. A destination address of the IP header of the first data packet transmitted from the correspondent node 10 is defined as a mobile IP address of the mobile node 40. At the same time, the correspondent node 10 transmits to the home agent 20 a binding request message for requesting an address of the foreign agent 30 that connects a radio channel to the mobile node 40.

As mentioned above, in the home agent 20, an IP address of the foreign agent 30 to be connected to the mobile node 40 through the radio channel is previously registered. Thus, in step S120, the home agent 20 encapsulates the first data packet and transmits the encapsulated data packet to the foreign agent 30, and the foreign agent 30 then decapsulates the first data packet and provides the decapsulated packet data to the mobile node 40.

To enable the forward tunneling, the home agent 20 transmits a binding update message indicating an IP address of the foreign agent 30 to the correspondent node 10, in step S130. The correspondent node 10 then sends a binding acknowledge message to the home agent 20 in response to the binding update message.

Upon receipt of the binding update message, the correspondent node 10 can perform the forward tunneling. Further, in order to enable the reverse tunneling, the correspondent node 10 transmits a binding reverse information message including the tunneling indication message indicating whether it can perform reverse tunneling, by consulting the IP address of the foreign agent 30, in step S140. Herein, the binding reverse information message is transmitted to the foreign agent 30 through IP routing.

Figure 6:
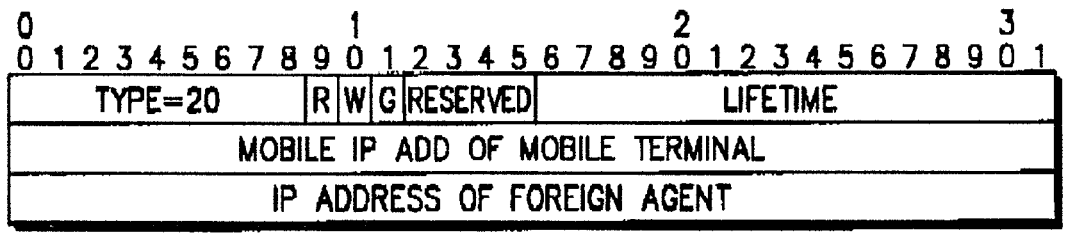
FIG. 6 is a diagram illustrating a format of a binding reverse information message according to an embodiment of the present invention.

The binding reverse information message has a format shown in FIG. 6, which has the 1-bit tunneling indication information R indicating whether the correspondent node 10 can perform reverse tunneling. In FIG. 6, the bit R=1 indicates whether the correspondent node 10 can perform reverse tunneling, while the bit R=0 indicates that the correspondent node 10 cannot perform reverse tunneling. Further, a bit M and a bit G indicate Minimal Encapsulation and GRE Encapsulation, respectively, which are different tunneling techniques. In addition, a Lifetime field indicates the time when the foreign agent 30 and the correspondent node 10 must store the tunneling indication information.

In step S150, the correspondent node 10 stores information indicating that it has already transmitted the tunneling indication information to the foreign agent 30, such that it is not required to retransmit the tunneling indication information when the correspondent node 10 IP-communicates with the foreign agent 30 in the same area again during the lifetime, which is a constant time determined by the binding reverse information message. After a lapse of the lifetime, the tunneling indication information are automatically deleted.

In step S160, the foreign agent 30 stores the tunneling indication information received from the correspondent node 10 to perform reverse tunneling even without retransmitting the tunneling indication information when the foreign agent 30 IP-communicates with the correspondent node 10 again during the lifetime, which is a constant time determined by the binding reverse information message.

After the correspondent node 10 and the foreign agent 30 store the information necessary for the reverse tunneling in the above-stated process, it is possible to transmit the data packets from the foreign agent 30 to the correspondent node 10 by reverse tunneling.

Figure 7:
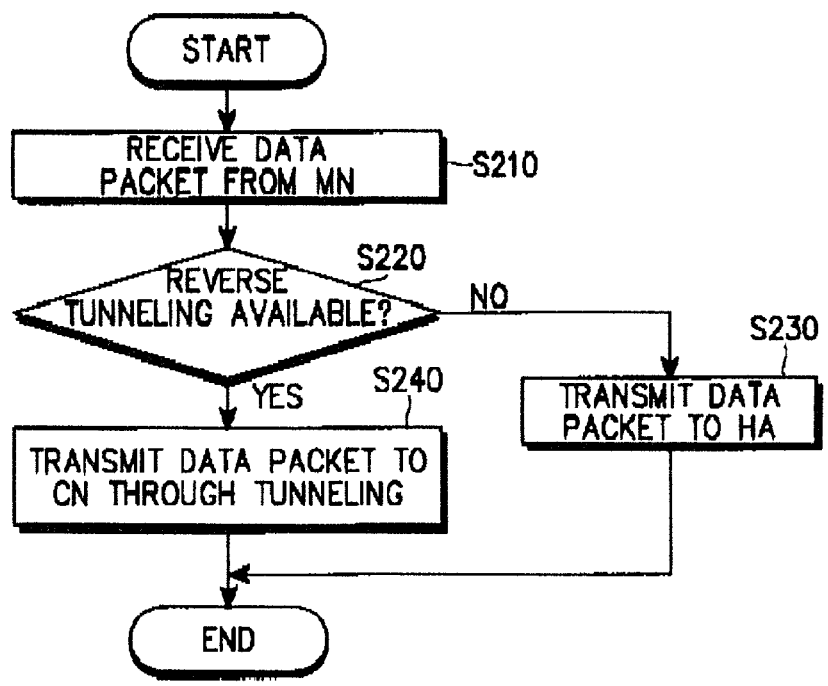
FIG. 7 is a flow chart illustrating a procedure for transmitting a packet data in a foreign agent according to an embodiment of the present invention.

FIG. 7 illustrates a procedure for transmitting a data packet in a foreign agent according to an embodiment of the present invention. Referring to FIG. 7, upon receipt of a data packet for IP communication with the correspondent node 10 from the mobile node 40 in step S210, the foreign agent 30 searches the previously stored tunneling indication information for the tunneling indication information for the correspondent node 10 and determines in step S220 whether the correspondent node 10 can perform reverse tunneling.

If the correspondent node 10 cannot perform reverse tunneling or there exists no tunneling indication information stored for the correspondent node 10, the foreign agent 30 transmits the data packet to the home agent 20 through tunneling in step S230. The home agent 20 then transmits the data packet to the correspondent node 10 through IP routing.

Otherwise, if the correspondent node 10 can perform reverse tunneling, the foreign agent 30 encapsulates the data packet with the tunneling IP header for reverse tunneling and transmits the encapsulated data packet to the correspondent node 10 in step S240. A destination address of the tunneling IP header is defined as the IP address of the correspondent node 10 and a source address of the tunneling IP header is defined as the IP address of the foreign agent 30. The correspondent node 10 separates the tunneling IP header and extracts the packet data by decapsulation.

By enabling both the forward tunneling from the correspondent node to the foreign agent and the reverse tunneling from the foreign agent to the correspondent node, it is possible to prevent a time delay in transmitting the data packets and efficiently satisfy the security required in the correspondent node. In addition, since the tunneling IP header added to the data packet transmitted through tunneling has an IP address of the intermediate transmitter, not an IP address of the initial transmitter or the final transmitter, the IP address of the initial transmitter of the final transmitter is not leaked out even though the data packet is hacked at any node (or router) on the transmission path.

While the invention has been shown and described with reference to a certain preferred embodiment thereof, it will be understood by those skilled in the art that various changes in form and details may be made therein without departing from the spirit and scope of the invention as defined by the appended claims. For example, the correspondent node may receive the binding update message from the home agent for several reasons such as a handoff. In any case, once the correspondent node knows the IP address of the foreign agent, it transmits the tunneling indication information to the corresponding foreign agent. As another example, upon receipt of a packet data for mobile IP communication from the correspondent node, the home agent can always transmit the IP address of the corresponding foreign agent to the correspondent node, even though the binding request message is not received. In this case, the correspondent node is not required to transmit the binding acknowledge message to the home agent.

What is claimed is:

1. A method for transmitting a data packet from a mobile node to a correspondent node through a foreign agent while maintaining security therebetween, in a communication system including the mobile node having a unique mobile IP (Internet Protocol) address, the foreign agent wirelessly connected to the mobile node, the foreign agent having a unique IP address, a home agent capable of performing bi-directional wire communication with the foreign agent, the home agent having mapped information of the mobile IP address of the mobile node and the IP address of the foreign agent, and the correspondent node capable of performing bi-directional wire communication with the home agent, the method comprising the steps of:

receiving in the correspondent node the IP address of the foreign agent, mapped with the mobile IP address of the mobile node through the home agent; and transmitting tunneling indication information indicating whether the correspondent node can decapsulate a data packet encapsulated by the foreign agent, from the correspondent node to the foreign agent having the IP address.

2. The method as claimed in claim 1, further comprising the steps of:

receiving in the home agent a signal requesting transmission of the IP address of the foreign agent from the correspondent node; and transmitting the IP address of the foreign agent from the home agent to the correspondent node in response to the signal requesting transmission of the IP address of the foreign agent.

3. The method as claimed in claim 2, further comprising the step of transmitting the signal requesting transmission of the IP address of the foreign agent wirelessly connected to the mobile node to the home agent, after transmitting a first data packet for communication with the mobile node to the home agent.

4. The method as claimed in claim 3, further comprising the step of storing information indicating that the tunneling indication information has been transmitted to the foreign agent, in the correspondent node for a predetermined time.

5. The method as claimed in claim 1, further comprising the steps of:

receiving in the foreign agent the tunneling indication information from the correspondent node; and encapsulating in the foreign agent a data packet received from the mobile node with a tunneling IP header for reverse tunneling and transmitting the encapsulated data packet to the correspondent node, when the tunneling indication information indicates that the correspondent node can perform decapsulation.

6. The method as claimed in claim 5, further comprising the step of storing the tunneling indication information received from the correspondent node in the foreign agent for a predetermined time.

7. A method for transmitting a data packet from a mobile node to a correspondent node through a foreign agent while maintaining security therebetween, in a communication system including the mobile node having a unique mobile IP address, the foreign agent wirelessly connected to the mobile node, the foreign agent having a unique IP address, a home agent capable of performing bi-directional wire communication with the foreign agent, the home agent having mapped information of the mobile IP address of the mobile node and the IP address of the foreign agent, and the correspondent node capable of performing bi-directional wire communication with the home agent, the method comprising the steps of:

transmitting a first data packet for communication with the mobile node from the correspondent node to the home agent;

upon receipt of the first data packet from the home agent, transmitting the first data packet from the foreign agent to the mobile node through a radio channel;

transmitting the IP address of the foreign agent from the home agent to the correspondent node after transmitting the first data packet to the foreign agent;

transmitting tunneling indication information indicating whether the correspondent node can decapsulate a data packet encapsulated by the foreign agent, from the correspondent node to the foreign agent, after receiving the IP address of the foreign agent from the home agent; and encapsulating in the foreign agent subsequent data packets received from the mobile node with a tunneling IP header for reverse tunneling and transmitting the encapsulated data packets to the correspondent node, after receiving the tunneling indication information from the correspondent node.

8. A method for exchanging data packets between a mobile node and a foreign agent while maintaining security therebetween, in a communication system including the mobile node having a unique mobile IP address, the foreign agent wirelessly connected to the mobile node, the foreign agent having a unique IP address, a home agent capable of performing bi-directional wire communication with the foreign agent, the home agent having mapped information of the mobile IP address of the mobile node and the IP address of the foreign agent, and a correspondent node capable of performing bi-directional wire communication with the home agent, the method comprising the steps of:

receiving a transmitted data packet encapsulated with a tunneling IP header for forward tunneling from the correspondent node to the foreign agent using the IP address of the foreign agent;

decapsulating in the foreign agent the data packet received from the correspondent node and transmitting the decapsulated data packet to the mobile node; and upon receipt of a data packet for communication with the correspondent node from the mobile node through a radio channel, determing from previously stored tunneling indication information whether the correspondent node can perform a reverse tunneling function, and encapsulating in the foreign agent the received data packet with a tunneling IP header for reverse tunneling, and transmitting the encapsulated data packet to the correspondent node.

9. A method for transmitting a data packet from a mobile node to a correspondent node through a foreign agent while maintaining security therebetween, in a communication system including the mobile node having a unique mobile IP address, the foreign agent wirelessly connected to the mobile node, the foreign agent having a unique IP address, a home agent capable of performing bi-directional wire communication with the foreign agent, the home agent having mapped information of the mobile IP address of the mobile node and the IP address of the foreign agent, and the correspondent node capable of performing bi-directional wire communication with the home agent, the method comprising the steps of:

receiving at the foreign agent a data packet for communication with the correspondent node from the mobile node through a radio channel;

transmitting tunneling indication information indicating whether the correspondent node can decapsulate a data packet encapsulated by the foreign agent, from the correspondent node to the foreign agent having the IP address;

determining in the foreign agent whether the correspondent node can perform reverse tunneling, by consulting the tunneling indication information;

encapsulating the data packet with a tunneling IP header for reverse tunneling and transmitting the encapsulated data packet to the correspondent node, if the correspondent node can perform reverse tunneling; and transmitting the data packet to the correspondent node through the home agent, if the correspondent node cannot perform reverse tunneling.

10. The method as claimed in claim 9, wherein the tunneling indication information is received from the correspondent node to the foreign agent.

11. The method as claimed in claim 10, wherein the tunneling indication information received from the correspondent node is stored in the foreign agent for a predetermined time.

\* \* \* \* \*